June 21, 1960     P. C. WARNER     2,941,850
BEARING APPARATUS
Filed Aug. 10, 1959
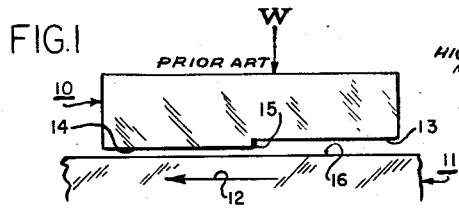
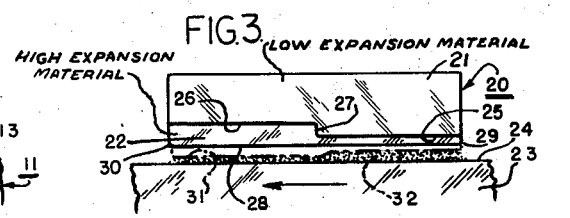
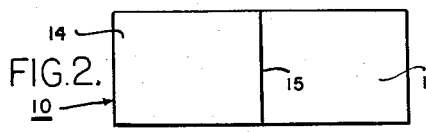
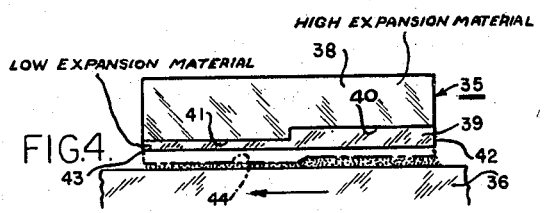
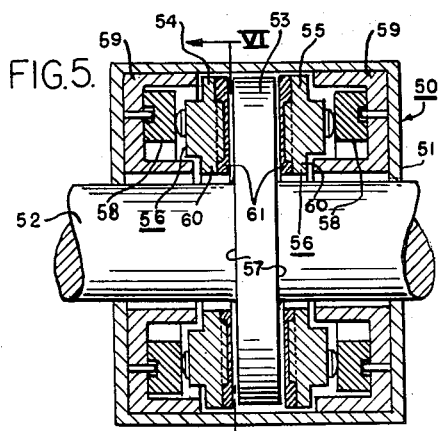
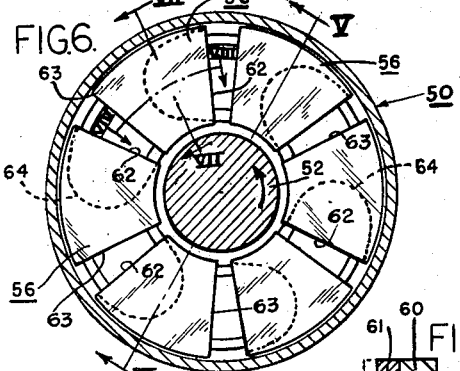
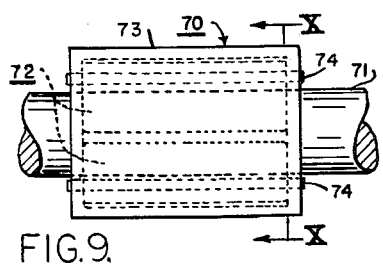
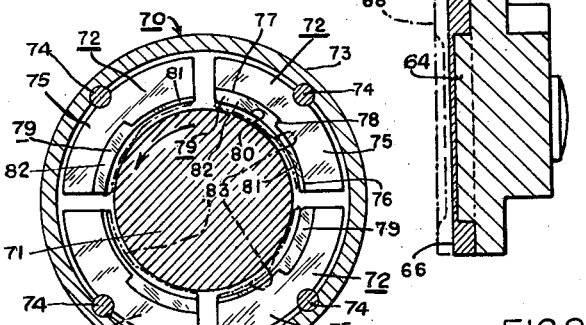
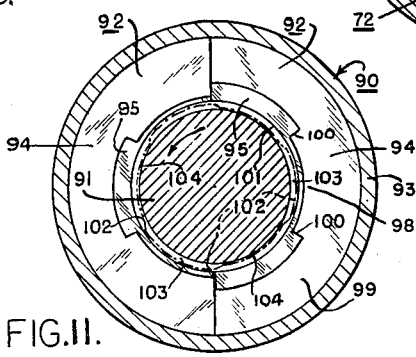
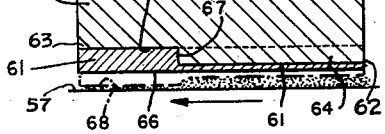
INVENTOR
PAUL C. WARNER United States Patent Office 2,941,850
Patented June 21, 1960

2,941,850

BEARING APPARATUS

Paul C. Warner, Media, Pa., assignor to Westinghouse Electric Corporation, East Pittsburgh, Pa., a corporation of Pennsylvania Filed Aug. 10, 1959, Ser. No. 832,540

4 Claims. (Cl. 308—73)

This invention relates to bearings, more particularly to the type of bearing which is slidably disposed relative to the runner or shaft element associated therewith and operable with a lubricating fluid film disposed therebetween.

One of the main objects of the invention is to provide an improved bearing structure of this type, which is easily manufactured while maintaining the extremely close tolerances required in high performance bearing structures of this type.

It is well known in the art, that for optimum performance, maximum separation of the relatively slidable surfaces must be maintained for any prescribed load. Such separation is maintained by the lubricating fluid film thickness. Many shapes have heretofore been proposed for obtaining maximum fluid film thickness between the relatively slidable surfaces of the bearing structure. However, as well known in the bearing art, the stepped or wedge shaped bearing is one of the most effective thus far known types. Such wedge shaped bearing structures, when heavily loaded, may provide a lubricating film thickness of only .00025 to .0005 inch. Accordingly, it will be obvious that with bearing structures designed to operate with such thin lubricating fluid films, minimum variations in the surface from the desired contour must be maintained.

The wedge shaped bearing structure includes a bearing member arranged to slidably support a runner element movable therepast in a path relative to the former with a lubricant film formed therebetween. To maintain the thickness of the fluid film at the maximum value for a prescribed load, the bearing member is provided with a carefully finished bearing surface having a leading surface portion and a trailing surface portion offset about .002 to .0005 inch with relation to each other and forming a shoulder at the junction therebetween. Accordingly, in operation, the bearing structure maintains a lubricating fluid film which is of greater thickness adjacent the leading portion than the thickness of the fluid film adjacent the trailing portion, and is effective to maintain the thickness of the latter film at a larger value than attained with other known arrangements for any prescribed load.

However, manufacture of a wedge shaped bearing of the type described above is exceedingly difficult because of the extreme precision required in finishing the bearing surfaces for proper operation.

Accordingly, it is a further object of the invention to provide a wedge shaped bearing structure which may be more readily manufactured and maintained within the required manufacturing tolerances.

A more specific object of the invention is to provide a wedge shaped bearing structure in which the bearing member is formed of two materials having different coefficients of expansion and arranged in such a manner that the bearing surface may define a continuous and uninterrupted surface at normal room temperatures, while expanding when heated to operating temperatures to provide the relative offset required between the leading and trailing surface portions of the bearing member.

In accordance with the invention, the bearing member is provided with a backing member and a facing member formed of materials having different coefficients of expansion. When the backing member is made of a low expansion material and the facing member is made of a high expansion material, the backing member is provided with stepped interfacial surface portions having a shoulder so formed therebetween and of such a height that when the facing member is applied thereto and finished to a smooth continuous surface contour, the facing member has a leading bearing surface portion of less thickness than its trailing surface portion at normal atmospheric temperatures. Accordingly, the bearing may be easily finished to the required tolerances by ordinary manufacturing processes.

In operation, as the bearing member becomes heated to its normal operating temperature, the thermal growth or expansion of the composite leading portion of the bearing structure is less than that of the trailing portion of the bearing structure in a direction normal to the surface of the runner member, thereby causing a discontinuity in the two surface portions in the region adjacent the shoulder of the backing member and imparting the desired wedge shape to the effective bearing surface.

Further, in accordance with the invention, when the backing member is formed of high expansion material and the facing member is formed of low expansion material, the shoulder in the interfacial surface of the backing member is reversed, thereby causing the thickness of the low expansion material at the leading surface portion of the bearing support to be larger than the trailing surface portion. Upon expansion, a discontinuity is attained in the surface of the facing member due to the greater degree of expansion of the composite trailing portion, in a manner similar, but converse, to the above described arrangement.

The above and other objects are effected by the invention as will be apparent from the following description and claims taken in connection with the accompanying drawing forming a part of this application, in which:

Figs. 1 and 2 are diagrammatic views illustrating the wedge shaped bearing structure of the prior art;

Figs. 3 and 4 are diagrammatic views illustrating wedge shaped bearing structures formed in accordance with the invention;

Fig. 5 is an axial sectional view taken on line V—V of Fig. 6 and showing, in highly simplified form, a thrust bearing of the double acting type having the invention incorporated therein;

Fig. 6 is a cross-sectional view taken on line VI—VI of Fig. 5;

Figs. 7 and 8 are enlarged sectional views of a thrust shoe taken on lines VII—VII and VIII—VIII, respectively, of Fig. 6;

Fig. 9 is an elevational view of a pivoted shoe journal bearing embodying the invention;

Fig. 10 is an enlarged sectional view taken on line X—X of Fig. 9; and

Fig. 11 is an end view of a rigidly supported journal bearing incorporating the invention.

Referring to the drawing in detail, in Figs. 1 and 2 there is shown a stepped or wedge shaped bearing 10 formed in accordance with the prior art and arranged to slidably bear against a runner element 11 movable therepast in the direction of the arrow 12. The bearing member 10 is provided with a stepped facing portion including a leading surface portion 13 of smooth contour and a trailing surface portion 14 of smooth contour. The leading and trailing surfaces 13 and 14 are offset relative to each other by a shoulder portion 15. The height of the shoulder portion 15 has been greatly exaggerated, for clarity of illustration, since in practice it is on the order of about .00025 to .002 inch. Since the runner element 11 has a smooth and continuous surface 16, the lubricating fluid film disposed between the bearing and runner elements is thicker in the leading portion than in the trailing portion. Accordingly, in a manner well known in the art, when the bearing 10 is subjected to a load W urging it towards the runner element 11, the minimum thickness of the lubricating fluid film (that is the fluid film adjacent the trailing portion 14) is maintained at a highly suitable and uniform value for the bearing.

However, it will be noted that since the bearing member 10 is provided with a unitary facing portion including the leading portion 13, the shoulder 15 and the trailing portion 14, extreme care and precision are required for its manufacture. Further, in operation under temperature, temperature gradient and load, the bearing member is subject to distortion sufficient to change the shape and thickness of the fluid film with adverse effects such as localized loss of fluid film with attendant rapid wear.

In Fig. 3 there is shown a bearing member 20 formed in accordance with the invention and including a substantially rigid backing member 21 of low expansion material and a facing member 22 of high expansion facing material connected in intimate back-to-back relation with each other. The bearing member 20 is cooperatively associated with a runner member 23, movable therepast in the direction indicated by the arrow, which runner member may be similar to the runner member 11 shown in Fig. 1 and having a smooth continuous surface 24.

Considering the bearing member 20 at normal atmospheric temperatures, as illustrated by the solid lines, the backing member 21 has a leading interfacial surface portion 25 disposed in offset relation with the trailing interfacial surface portion 26 and having a shoulder portion 27 of predetermined height disposed between the two surfaces. The leading and trailing surfaces 25 and 26 are so disposed that when the facing member 22 is applied thereto and finished to provide a smooth and continuous bearing surface 28, the leading portion 29 of the facing member is substantially thinner than the thickness of the trailing portion 30. Accordingly, the bearing surface 28 may be easily and accurately machined to its smooth and continuous contour by the usual machining processes, while maintained at substantially normal atmospheric temperatures.

During operation, the bearing member 20 becomes heated to its normal operating temperature, which temperature is substantially higher than the normal ambient temperatures. As the temperature of the bearing member increases, the expansion of the backing member 21 in a direction normal to the direction of movement of the runner member 23 is of a relatively small order. Further, the differential expansion of the backing member in this direction between its leading portion 25 and trailing portion 26 may be of a considerably smaller order. However, the differential expansion between the leading portion 29 and trailing portion 30 of the facing member is of a considerably higher order than that of the backing member, so that the difference or relative expansion between the composite leading portion 25, 29 and the composite trailing portion 26, 30 of the bearing member 20 attains a value on the order of from .00025 to .002 inch, thereby providing a discontinuity in the bearing surface 28 and forming an effective bearing surface (indicated by the dot-dash line 31) which approaches the wedge shape of the bearing member 10 illustrated in Figs. 1 and 2. Accordingly, the fluid film 32 residing between the effective bearing surface 31 and the surface 24 of the runner member attains the shape illustrated by the stippling. More specifically, the thickness of the fluid film 32 is greater in the leading portion of the bearing than in the trailing portion of the bearing, thereby to impart all of the desirable qualities to the bearing of the stepped bearing structure 10, illustrated in conjunction with the prior art in Figs. 1 and 2, but at considerably less expense and with greater ease of manufacture. The height of the shoulder 27 is dependent on the coefficient of expansion of the materials selected for the backing and facing members. However, it is considerably larger than the height of the step in the bearing surface and may be on the order of ⅜ inch. In this connection, it will be noted that since the offset surfaces 25 and 26 are provided in the backing member, and the shoulder 27 is relatively large, the extreme precision required for bearing surfaces is not required in the manufacture of the offset surfaces 25 and 26 and the shoulder 27.

In Fig. 4 there is shown a bearing member 35 operatively associated with a runner member 36 movable therepast in a path indicated by the arrow. The bearing member 35 is similar to the bearing member 20 shown in Fig. 3 and differs therefrom in the selection of materials employed in its manufacture. More specifically, the bearing member 35 has a backing member 38 formed of high expansion material and a facing member 39 formed of low expansion material bonded thereto in any suitable manner. In this embodiment, since the appreciable expansion occurs in the backing member 38, the backing member is formed with an interfacial leading surface 40 and a trailing interfacial surface portion 41 offset relative to each other in a reverse manner to that shown in Fig. 3, so that, when the facing member 39 is applied to the backing member 38, the thickness of the leading portion 42 of the facing member is greater than the thickness of the trailing portion 43, as illustrated in solid lines.

During operation, in a manner similar to that described in conjunction with the embodiment shown in Fig. 3, the relative expansion of the high expansion material in a direction normal to the surface of the runner element 36 is greater in the trailing portion 41 than in the leading portion 40 of the backing member 35, thereby deforming the surface of the facing member 39 to provide an effective bearing surface of stepped shape (indicated by the dot-dash lines 44), similar to the effective bearing surface 31 attained with the embodiment shown in Fig. 3.

In view of the above, it will now be understood that the invention may be successfully practiced by combining a high expansion material with a low expansion material, regardless of whether the backing member or the facing member is formed of the low expansion material. Such low expansion materials and high expansion materials suitable for bearing manufacturing have been thoroughly explored in the prior art and need not be specifically listed herein.

Figs. 5 and 6 show the invention incorporated in a thrust bearing 50. The thrust bearing 50 is of a well known type and comprises a housing 51 encompassing a rotatable shaft 52 having an annular collar 53 for transmitting the thrust of the shaft 52 in either axial direction to a pair of annular rows 54 and 55 of bearing shoes. Since the bearing structure 50 absorbs the thrust of the collar 53 in either axial direction, the row 54 of bearing shoes and its associated structure may be identical to the row 55 of bearing shoes and its associated structure.

As best shown in Fig. 5, the annular row 54 of bearing shoes comprises a plurality of bearing shoes 56 disposed in abutment with the juxtaposed radial face 57 of the thrust collar 53 and maintained in proper position relative thereto by an equalizing ring member 58 positioned within an annular inner housing 59 in such a manner as to provide equal pressure upon the bearing shoes 56. The inner housing 59 may be adjustably arranged within the outer housing 51 by any suitable means (not shown), as well known in the art.

In accordance with the invention, each of the bearing shoes 56 comprises a backing member 60 and a facing member 61 bonded or otherwise joined thereto. In this embodiment, the backing member 60 is formed of a low expansion material while the facing member 61 is formed of a high expansion material. Referring to Fig. 6, each of the bearing shoes 56 has a leading portion 62 and a trailing portion 63 with respect to the direction of rotation of the shaft 52 as indicated by the arrow. The backing member 60, as best shown in Fig. 8, has a leading portion 64 and a trailing portion 65 which are offset relative to each other. The facing member 61 is provided with a flat bearing surface 66 adapted to cooperate with the collar surface 57 with a lubricating fluid film residing therebetween. The leading portion 64 of the backing member 60 is of arcuate shape (Fig. 6) and extends toward the collar surface 57 to a greater degree than the trailing portion 65, so that the thickness of the facing member 61 is less at the leading portion 62 than at the trailing portion 63 of the shoe. In this embodiment, the shoulder 67 defined by the leading and trailing portions 64 and 65 of the backing member 60 is of arcuate shape, as shown in Fig. 6.

Accordingly, in a manner similar to that described in conjunction with the embodiment shown in Fig. 3, at normal atmospheric temperature the bearing surface 66 is substantially flat, as illustrated in solid lines in Figs. 7 and 8. However, when the bearing attains its normal operating temperature, the relative expansion between the composite leading portion of the facing member and the composite trailing portion of the facing member will cause the bearing surface 66 to attain the wedge shape indicated by the dot-dash lines 68. In this case however, the effective bearing surface 68 is offset as indicated by the dotted lines in Fig. 6, thereby to provide a minimum fluid film thickness not only in the region intermediate the trailing surface of the shoe and the collar surface 57 but also along the lateral surfaces of the shoe.

Figs. 9 and 10 show the invention incorporated in a pivoted shoe journal bearing 70, of a type generally well known in the art, for rotatably supporting a journal 71. The bearing structure 70 includes a plurality of arcuate bearing shoes 72, for example four, disposed within a tubular housing 73 and supported therein for pivotal movement by axially extending pins 74 disposed intermediate the shoes and the housing as best shown in Fig. 10. With this arrangement, the bearing shoes 72 are free to pivot about the pins 74 to a limited degree to accommodate the contour of the journal 71 with the least possible interference.

In accordance with the invention, each of the shoes 72 is provided with a backing member 75 having a leading interfacial surface portion 76 and a trailing interfacial surface portion 77 in offset relation to each other and having an axially extending shoulder 78 formed therebetween. The bearing shoes 72 are further provided with a facing member 79 bonded to the backing member 75 and having a cylindrical bearing surface 80 which is substantially smooth and continuous at normal ambient atmospheric temperatures. The backing member 75 is of low expansion material while the facing member 79 is of high expansion material. Accordingly, in a manner similar to that described in conjunction with the embodiment shown in Fig. 3, the leading portion 81 of the facing member is of substantially thinner radial thickness than the thickness of the trailing portion 82. However, as the bearing shoes 72 attain their normal working temperature, an effective wedge shaped bearing surface is attained, as indicated by the dot-dash lines 83. In this embodiment, the shoulder 78 extends substantially in a direction parallel to the axis of the journal 71.

Fig. 11 shows the invention incorporated in a journal bearing 90 of the rigidly supported shoe type for rotatably supporting a cylindrical journal 91. In this embodiment, there is provided a pair of semi-annular bearing members 92 firmly held within a tubular outer housing 93. Here again, each of the bearing members 92 is provided with a backing member 94 of high expansion material and a facing member 95 of low expansion material. The backing members 94 are provided with alternately disposed thick and thin portions 98 and 99 forming axially extending shoulders 100 at their junctions.

The facing member 95 is joined or otherwise firmly attached to the associated backing member 94 and finished to provide a smooth and continuous bearing surface 101. The bearing surface 101 in this case is substantially cylindrical in shape. As the bearing 90 attains its normal operating temperature, the shape of the bearing surface 101 is modified to provide a stepped effective bearing surface, as indicated by the dot-dash lines 102, thereby providing alternately thick and thin film spaces 103 and 104, respectively, with reference to the direction of travel of the journal 91.

It will now be seen that the invention provides a bearing structure which attains the highly desired wedge or stepped shape in operation for optimum efficiency, yet which can be manufactured economically and expeditiously by the usual machining processes.

It will further be seen, that the invention lends itself to the provision of bearing structures employing present backing and facing materials arranged to take advantage of the thermal expansion properties of the two members.

While the invention has been shown in several forms, it will be obvious to those skilled in the art that it is not so limited, but is susceptible of various other changes and modifications without departing from the spirit thereof.

What is claimed is:

1. A bearing member for a runner element movable in a path relative to the former with a lubricant film formed therebetween, said bearing member comprising a backing member and a facing member connected in intimate back-to-back relation with each other, said backing member having a leading portion of uniform thickness and a trailing portion of uniform thickness, the thickness of said trailing portion being different than the thickness of said leading portion, said leading and trailing portions jointly defining a shoulder of predetermined height extending transversely to the path of movement of said runner element, and said facing member having a leading portion and a trailing portion coextensive with said backing member and defining a smooth and continuous bearing surface at a first temperature, said backing member being formed of a material having a different coefficient of expansion than said facing member, whereby at a second and higher temperature the differential expansion between said backing member and said facing member effects a discontinuity in the bearing surface of said facing member in the region adjacent said shoulder.

2. A bearing member for a runner element movable in a path relative to the former with a lubricant film formed therebetween, said bearing member comprising a substantially rigid backing member and a facing member connected in intimate back-to-back relation with each other, said backing member having a smoothly faced leading portion and a smoothly faced trailing portion, said leading and trailing portions being offset relative to each other and jointly defining a shoulder of predetermined height extending transversely to the path of movement of said runner element, and said facing member having a thin leading portion and a thick trailing portion coextensive with said backing member and defining a smooth and continuous bearing surface at normal atmospheric temperature, said backing member being formed of a material having a lower coefficient of expansion than said facing member, whereby with increasing temperatures the trailing portion of said facing member increases in thickness at a faster rate than the leading portion of said facing member and projects toward said runner to decrease the thickness of the lubricant film formed therebetween.

3. A bearing shoe for absorbing the thrust of a runner element slidably movable relative to the former with a lubricant film formed therebetween, said bearing shoe comprising a substantially rigid backing member and a facing member connected in intimate back-to-back relation with each other, said backing member having a flat leading portion and a flat trailing portion, said leading and trailing portions being offset relative to each other and jointly defining a shoulder of predetermined height extending transversely to the path of movement of said runner element, said facing member having a leading portion and a trailing portion coextensive with said backing member and defining a continuous flat bearing surface at normal atmospheric temperature, said backing member being formed of a material having a different coefficient of expansion than said facing member, whereby at normal operating temperatures the differential expansion between said backing member and said facing member effects movement of said trailing portion of the facing member toward said runner element.

4. A bearing member for a runner element movable in a path relative to the former with a lubricant film formed therebetween, said bearing member comprising a backing member and a facing member bonded to each other in intimate back-to-back relation, said backing member having a leading portion and a trailing portion each of which has a smooth continuous surface but offset relative to each other to define a shoulder extending transversely to the path of movement of the runner element, said facing member having a leading portion and a trailing portion of greater thickness than the former, said facing having a smooth and continuous external surface at a first temperature, said backing member being formed of a material having a different coefficient of expansion than said facing material, whereby at a second and higher temperature the differential expansion between said backing member and said facing member effects a discontinuity in the surface of said facing member and causes the surface of the trailing portion of the facing member to project beyond the surface of the leading portion of the facing member.

References Cited in the file of this patent

UNITED STATES PATENTS 2,363,430     Meldahl     Nov. 21, 1944